United States Patent [19]

Weber et al.

[11] Patent Number: 4,924,486

[45] Date of Patent: * May 8, 1990

[54] FILM-RECEIVING CASSETTE HAVING SPIRAL GUIDE PLATE

[75] Inventors: Otto K. Weber, Chatsworth; Lief A. Johansson, Agoura, both of Calif.

[73] Assignee: Medrad, Inc., Pittsburgh, Pa.

[*] Notice: The portion of the term of this patent subsequent to Jan. 9, 2007 has been disclaimed.

[21] Appl. No.: 263,894

[22] Filed: Oct. 28, 1988

Related U.S. Application Data

[62] Division of Ser. No. 801,595, Nov. 23, 1985, Pat. No. 4,782,504.

[51] Int. Cl.$^5$ .............................................. G03B 42/02
[52] U.S. Cl. .................................... 378/173; 378/172; 378/174
[58] Field of Search .............................. 378/171-174, 378/181-182, 195; 354/310; 355/14 S H

[56] References Cited

U.S. PATENT DOCUMENTS

| | | | |
|---|---|---|---|
| 3,735,130 | 5/1973 | Bock et al. | 378/171 |
| 3,775,613 | 11/1973 | Hommerin | 378/173 |
| 3,862,426 | 1/1975 | Thomas | 378/172 |
| 3,967,126 | 6/1976 | Otto, Sr. | 378/195 |
| 4,234,796 | 11/1980 | Caugant et al. | 378/173 |
| 4,417,356 | 11/1983 | Hoffman | 378/173 |
| 4,418,420 | 11/1973 | Bauer et al. | 378/171 |
| 4,428,658 | 1/1984 | Moore et al. | 354/310 |

FOREIGN PATENT DOCUMENTS

| | | | |
|---|---|---|---|
| 300 | 7/1906 | Fed. Rep. of Germany | 206/408 |
| 1931645 | 12/1970 | Fed. Rep. of Germany | 378/173 |
| 1096802 | 12/1987 | United Kingdom | . |

Primary Examiner—Carolyn E. Fields
Assistant Examiner—David P. Porta
Attorney, Agent, or Firm—Fleit, Jacobson, Cohn, Price, Holman & Stern

[57] ABSTRACT

A programmable X-ray film changer for use, for example, in making angiograms, is provided with an improved pressure plate mechanism, feed and removal mechanism, photographic plate indexing mechanism, a clutched single cycle drive mechanism, a receiving photographic plate cassette and control methodology. The improvements in combination permit a substantial reduction of the number of parts in the film changer resulting in increased reliability, a decrease in the expense of manufacture, and decreased weight. Furthermore, the X-ray photographic film changer is arbitrarily orientable in space and independent of gravity feed mechanisms or the interference of gravity with respect to its operation. The improved pressure plate is normally substantially flat and is bowed to form a convex surface by a pressure plate bowing mechanism. Misfeeds of multiple numbers of photographic plates are thus tolerated by the natural resiliency of the pressure plate. Bowing of the pressure plate is used to actuate feeding and removal of the photographic plates into the exposure position. Alphanumeric information is arbitrarily photographically printed onto the photographic plate subject to programmable control. The exposed photographic plates are disposed within a spiral receiving cassette. The natural resiliency of the photographic plates lays the photgraphic plate on the radially outermost surface of the spiral receiving chamber. Thus, receipt and storage of the exposed photographic plates is independent of gravity feed. The operational cycle of the film changer is arbitrarily programmable and controlled through a single cycle clutch which is driven by a continuously operated motor. Thereby, multiple film changers can be operated in combination through arbitrary program control without synchronization of their respective drive motors.

8 Claims, 6 Drawing Sheets

FILM-RECEIVING CASSETTE HAVING SPIRAL GUIDE PLATE

This is a divisional of application Ser. No. 801,595, filed Nov. 23, 1985 now U.S. Pat. No. 4,782,504.

BACKGROUND OF THE INVENTION

1. Field of the Invention

The invention relates to an apparatus and methods for exposing and transporting photographic film plates in a device for taking X-ray photographs in medical applications, and in particular the invention relates to a programmable high-speed film changer used for taking sequences of x-ray photographs.

2. Description of the Prior Art

Sequences of X-ray exposures are required in medical diagnostic techniques, such as in the making of angiograms. During such techniques it is necessary to expose a number of X-ray film plates in timed succession with possibly as many as four such plates being exposed in a second. The series of exposed X-ray photographs then provides a time record of a moving or pulsating organ such as the heart, or may show the progress of a radiopaque dye through tissue or an organ. The radiopaque dye is often quickly dispersed throughout the body's vascular system after injection. In particular the dye will enter and first flow through any particular tissue or organ, such as the brain, only during a predetermined time period, after which the dye becomes diluted and uniformly spread throughout the organ in question.

Therefore, it is necessary to expose a series of photographic plates to an X-ray image in rapid succession and during the predetermined time interval. The prior art has devised diagnostic X-ray equipment wherein photographic plates are serially transported from a cartridge into an exposure frame. When in the exposure frame, the photographic plate is sandwiched between two X-ray photoluminescent layers. The reaction of the X-ray photoluminescent layers to scattered X-rays from the tissue generates visible light which then exposes adjacent areas of the photographic film which are in contact with the X-ray photoluminescent layers. The exposed plate is then transported from the exposure frame into a storage cassette for removal and handling. The photographic sheets are generally large resilient plastic sheets, approximately 14" by 14". The plates must be pressed into close and intimate contact with the photoluminescent sheets in order to provide a high resolution and accurate image of the shadow cast by the X-ray beam.

The prior art design of such X-ray film changers has been susceptible to a number of defects and limitations. Firstly, the manner in which X-ray film is fed into the exposure plane and then pressed between the X-ray photoluminescent sheets often results in serious damage to the equipment in the cases where a multiple number of sheets are misfed into the exposure frame. Secondly, the receiving film cassette, which receives the exposed photographs plates, is typically operationally dependent upon gravity feed in order to stack a multiple number of exposed X-ray plates. Therefore, the spatial orientation of the X-ray equipment is limited and in certain orientations the equipment becomes inoperable. This is particularly disadvantageous when a series of X-ray exposures are taken through a range of angular orientations with respect to the patient. It is possible that in some portion of the range of angular orientations, the prior art X-ray film changer will jam with consequential serious mechanical damage to the changer.

Furthermore, in applications where two or more film changers are used to simultaneously or alternatively make X-ray exposures of a patient from two or more different angles during a single diagnostic run or x-ray exposure, the feed, exposure and removal of the X-ray plates within each film changer must be carefully synchronized with respect to each other. Lack of proper synchronization between two or more film changers will result in an erratic and haphazard series of X-ray photographs being taken which will not have the desired temporal relationship with respect to each other.

Therefore, the prior art has incorporated various means for synchronizing the operation of the transport motors within each of the film changers and has included various types of sensing devices in the design in order to verify synchronization of the film transport between the changers.

Finally, prior art X-ray film changers generally have a limited number of operational cycles available. In other words, the timing cycle of the film transport mechanism in prior art film changers is fixed to a selected multiple of minimum periods. Therefore, the rate of film exposure in any one changer or the offset times between two prior art changers are always restricted to a multiple of some minimum time period.

Furthermore, prior art changers are relatively heavy, typically weighing as much as 60 pounds, and entail a substantially complex collection of electromechanical components.

What is needed is a high-speed, X-ray film changer which is not subject to the above defects and limitations of the prior art. Specifically, what is needed is a reliable and inexpensive film changer capable of achieving high exposure rates, which is tolerant of film misfeeds, and which is flexibly programmable alone or in combination with other similar units without requiring complex measures to achieve synchronization.

BRIEF SUMMARY OF THE INVENTION

The invention is an improvement in an X-ray film changer. The film changer includes a film supply cassette and a film exposure frame including at least one X-ray photoluminescent layer. The film supply cassette holds unexposed film to be fed into the film exposure frame. The improvement comprises a movable and substantially flat pressure plate disposed within the exposure frame for receiving the film from the film supply cassette. A mechanism for deforming the pressure plate is also provided. The pressure plate is configured into a generally convex surface with respect to the film. A mechanism for feeding the film from the film supply cassette into the exposure frame and onto the pressure plate is further provided. A mechanism for moving the pressure plate against the film maintains the film in intimate contact with the X-ray photoluminescent layer within the exposure frame. The mechanism for moving the pressure plate permits the pressure plate to assume a substantially flat configuration. A mechanism for removing the film from the exposure frame is included. A mechanism for receiving the film removed from the exposure frame is similarly included. As a result of this combination the film changer is tolerant of multiple sheet misfeeds from the film supply cassette into the exposure frame.

The mechanism for deforming the pressure plate actuates the mechanism for feeding the film onto the pressure plate. As a result the design of the film changer is simplified, the weight of the film changer is decreased, and the reliability of operation of the changer is increased.

The mechanism for removing the film from the exposure frame is actuated by the mechanism for deforming the pressure plate. As a result the design of the film changer is simplified, the weight of the film changer is decreased, and the reliability of operation of the changer is increased.

The mechanism for receiving film comprises a spiral chamber having an entrance aperture directed to and coupled to the exposure frame to permit exposed film to be transported by the mechanism for removing film from the exposure frame through the aperture into the spiral chamber. The film is resilient and tends to resist flexure within the spiral chamber. As a result the film is disposed next to the radially outermost surface of the spiral chamber, and the film changer is operationally independent of its orientation with respect to gravity.

The improvement further comprises a programmable mechanism for generating an arbitrary alphanumeric exposure on the film when in the exposure frame.

The mechanism for deforming the pressure plate comprises a single revolution clutch with a input shaft and output shaft. A mechanism for selectively and arbitrarily activating the clutch is coupled to the clutch. A continuously operating motor is coupled to the input shaft of the clutch. A mechanism for applying a retracting force on at least the periphery of the pressure plate is coupled to the pressure plate. The retractive force is in a direction away from the film when disposed on the pressure plate. The retractive force configures the pressure plate into a convex surface. The mechanism for applying the retracting force is coupled to the output shaft of the clutch. As a result the configuration of the pressure plate between its substantially flat and the convex form is selectively and arbitrarily effectuated.

The mechanism for feeding the film into the exposure frame comprises a film injection mechanism for moving film from the film supply cassette a predetermined distance within the exposure frame. The film injection mechanism is coupled to the drive output of the clutch. A continuously driven first roller mechanism for imparting a transporting force to the film to transport the film onto the pressure plate is coupled to the motor. A first pinch roller for selectively engaging the first roller mechanism with the film disposed in the exposure frame by the film injection mechanism is actuated by the mechanism for selectively deforming the pressure plate. As a result a motive force is applied to the film and the film is drawn into the exposure frame onto the pressure plate.

The mechanism for removing the film comprises a continuously driven second roller mechanism for imparting a motive force to remove the film from the exposure frame and to feed the film into the mechanism for receiving the film. The continuously driven second roller mechanism is coupled to the motor. A second pinch roller for selectively engaging the film to the second roller mechanism is actuated by the mechanism for selectively deforming the pressure plate.

The improvement further comprises at least two film changers, wherein each film changer is improved as described above and further comprises a programmable mechanism for selectively and arbitrarily actuating each of the mechanisms of a selected one of the film changers with respect to another one of the film changers, whereby simultaneous, alternate and variably delayed operation of each film changer with respect to the other one of the film changers is selectively and arbitrarily determined.

The invention can also be characterized as a method for exposing multiple X-ray photographic plates in a film changer comprising the steps of generating a programmable command, selectively feeding photographic plates into the film changer at a selectively programmed rate, selectively feeding the photographic plates into the film changer in a timed relationship with a selected physiological event, and selectively repeating each of these steps so that an arbitrary sequence of X-ray exposures may be provided.

The method further comprises the steps of selectively actuating a peripheral device for movement of a patient, and repeating each of the previously recited steps of generating, selectively feeding, and selectively activating.

The method further comprises the steps of selectively actuating a peripheral device for injection of an X-ray interactive substance into the patient, and repeating the steps of generating, selectively feeding, and selectively actuating.

Each of the steps is selectively and arbitrarily effectuated by at least two of film changers, and each of the steps is performed in one of the film changers independently of each of the steps being performed in the other film changer. The sequence of steps in the two film changers is related only through selective programmable control comprising a temporal sequence of the steps of generating programmed commands.

The invention still further includes a method of exposing an X-ray photographic plate in a film changer including at least one X-ray photoluminescent layer. The method comprises the steps of disposing the photographic plate onto a pressure plate which is bowed under an applied force. The bowed pressure plate is relaxed and allowed to assume a preferred substantially flat configuration. Simultaneously the pressure plate is moved against the photographic plate so that the photographic plate is pressed against the at least one X-ray photoluminescent layer from the center of the photographic plate toward its periphery. As a result misfeed of multiple photographic plates onto the pressure plate is tolerated.

The method further comprises the steps of rebowing the pressure plate, simultaneously moving the pressure plate away from the photographic plate, and actuating a feeding mechanism for transporting the photographic plate into the exposure frame.

The invention is also an improvement in a method for exposing X-ray photographic plates in a film changer wherein a cycle of operational steps are selectively performed. The improvement comprises the steps of selectively actuating a single cycle of the operational steps, and continuously providing a motive force for effectuating the cycle of operational steps within the film changer. The motive force is selectively employed to effectuate the cycle of operational steps by selectively activating one of the cycles. As a result programmable flexibility of operation of the film changer is increased and coordinated operation of a multiple number of such film changers is made possible.

The invention is better understood by considering the following figures wherein like elements are referenced with like reference numerals.

The invention and its various embodiments may be better understood by now turning to the following detailed description.

DETAILED DESCRIPTION OF THE PREFERRED EMBODIMENTS

A programmable X-ray film changer for use, for example, in making angiograms, is provided with an improved pressure plate mechanism, feed and removal mechanism, photographic plate indexing mechanism, a clutched single cycle drive mechanism, a receiving photographic plate cassette and control methodology. The improvements in combination permit a substantial reduction of the number of parts in the film changer resulting in increased reliability, a decrease in the expense of manufacture, and decreased weight. Furthermore, the X-ray photographic film changer is arbitrarily orientable in space and independent of gravity feed mechanisms or the interference of gravity with respect to its operation. The improved pressure plate is normally substantially flat and is bowed to form a convex surface by a pressure plate bowing mechanism. Misfeeds of multiple numbers of photographic plates are thus tolerated by the natural resiliency of the pressure plate. Bowing of the pressure plate is used to actuate feeding and removal of the photographic plates into the exposure position. Alphanumeric information is arbitrarily photographically printed onto the photographic plate subject to programmable control. The exposed photographic plates are disposed within a spiral receiving cassette. The natural resiliency of the photographic plates lays the photographic plate on the radially innermost surface of the spiral receiving chamber. Thus, receipt and storage of the exposed photographic plates is independent of gravity feed. The operational cycle of the film changer is arbitrarily programmable and controlled through a single cycle clutch which is driven by a continuously operated motor. Thereby, multiple film changers can be operated in combination through arbitrary program control without synchronization of their respective drive motors.

Figure 1:
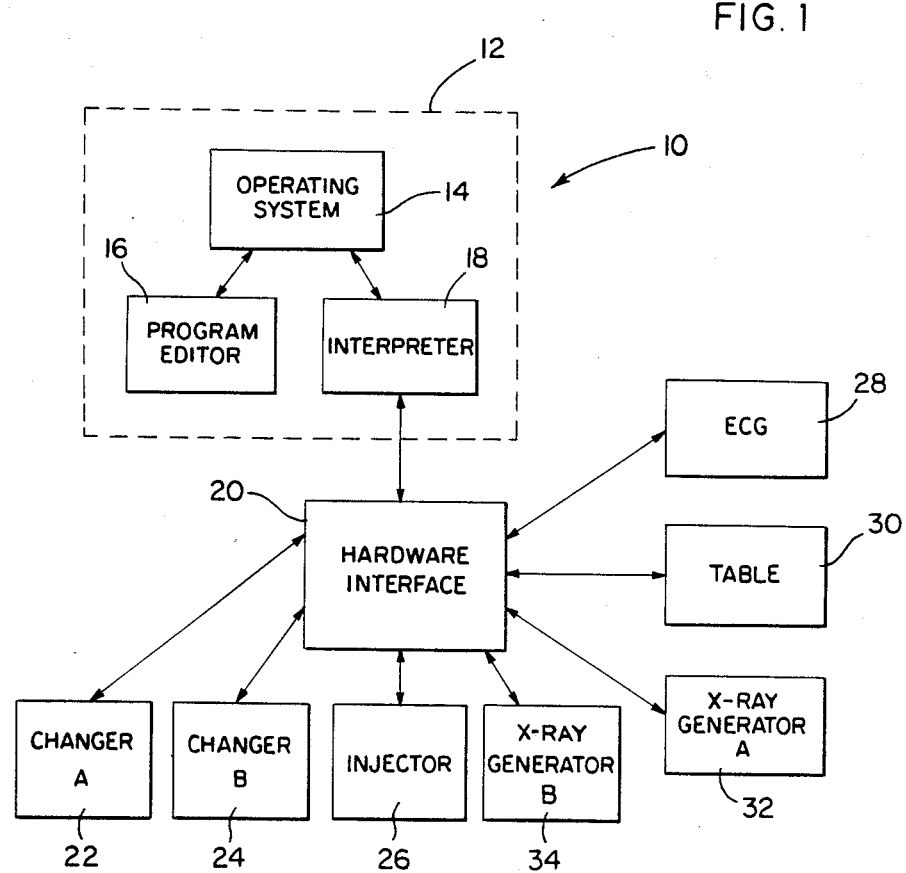
FIG. 1 is a schematic block diagram of an overall system incorporating the invention.

Turn now to FIG. 1, which is a block diagram of a high-speed X-ray photographic system, generally denoted by reference numeral 10 incorporating the invention. Control of system 10 originates within a conventional computer 12 symbolically indicated within the dotted outline. In the illustrated embodiment computer system 12 is a small personal computer such as an Apple IIE made by Apple Computer Inc. or its equivalent. Such small computer systems are well known to the art and therefore the system is not further described or depicted in any detail within FIG. 1. Instead, computer system 12 is symbolically shown in dotted outline as including three major software sections, namely an operating system, a program editor and an interpreter. Each section is written in assembly language according to well understood conventional principles. The operating system section 14 of the software control comprises a general program of operating commands for coordinating various hardware components of computer system 12 and other software sections. Once the operating system is installed within computer system 12, a section of the program, program editor 16, is called up and provides a sequence of menus to the user which allows the user to write a program which will operate X-ray photographic system 10. The menus in operation of program editor 16 will be described in greater detail below.

After the user has written the operational program which he desires for use, the user's program is then run by operating system 14. The user's program is provided as data to a software section, interpreter 18. Interpreter 18 will take the user's commands and from each user command generate the corresponding operational commands to effectuate the user's instruction. In many cases a plurality of separate command signals will be generated in a predetermined sequence for each user instruction. The series of command signals are provided as serial or parallel output signals from computer system 12 to a hardware interface unit 20. Hardware interface unit 20 is designed according to well understood and conventional principles to convert the digital signals from computer system 12 to a corresponding plurality of control signals for implementing the commands within X-ray photograph system 10. Thus, hardware interface 20 includes decoders, encoders, buffers, drivers, power supplies and the like, all combined in a conventional manner to translate the encoded digital commands from computer system 12 into the necessary analog or digital control signals required by X-ray photograph system 10.

In particular, interface unit 20 bidirectionally communicates with a plurality of peripherals to effectuate the user's program. An X-ray film changer 22, or changer A, is coupled to interface unit 20. Changer 22 will be described in greater detail in connection with the remaining Figures. An identical changer 24, changer B, may also be coupled to interface unit 20 so that at least two independent film changers may be programmably operated. An injector 26 is also coupled to and bidirectionally communicates with hardware interface unit 20. Injector 26 is a conventional injection mechanism for injecting a radiopaque dye into the patient being X-rayed. Therefore the amount and timing of the injection of the radiopaque dye can similarly be programmably controlled.

The patient may also be coupled to a conventional electrocardiographic apparatus 28 which is coupled to and bidirectionally communicates with interface unit 20. Therefore, ECG signals sensed within the patient can be converted into trigger signals for use in the operational sequence of X-ray photographic unit 10 in the manner described below.

Similarly, an examination table 30, upon which the patient is placed, can also be operated through conventional electromechanical means to position the patient with respect to the X-ray apparatus in a sequence of positions. Generally this is a left or right translation of the table and patient with respect to the X-ray exposure equipment. Table 30 is thus coupled to and bidirectionally communicates with interface unit 20 as well.

Finally, the X-ray generation equipment itself, X-ray generator 32, or generator A, and X-ray generator 34, generator B, are also coupled to and bidirectionally communicate with interface unit 20. Therefore, the generation of X-rays in any one of at least two units can be arbitrarily initiated by a user command. Communication with the peripheral units is bilateral so that the operational status of the units may be sensed as well as being able to transmit command signals to the peripherals.

Before considering the details of the apparatus and method of operation of film changers 22 and 24 in connection with FIGS. 2–11, consider first the general operation of X-ray photographic system 10 as depicted in Table 1 below.

TABLE 1

Title: program title
Doctor: put anything here
Patient: put anything here (Prompt appears here)

Event # Frames Rate ECG Table A/B/Sim/Alt Inj Delay
1
2
3
.
.
.

Catalog Load New Run Save Program

Table 1 is essentially a copy of the display screen as it appears on a CRT included within computer system 12. The command menu is displayed across the bottom of the screen and includes the commands, CATALOG, LOAD, NEW, RUN, SAVE, and PROGRAM The commands are chosen through a cursor control which is initially set on the menu line.

Selection of the command, CATALOG, overprints a replication of an index card on the screen which shows the names of all the user programs which may be stored on a data disk and read into the computer.

The command, LOAD, will generate a prompt at a prompt line asking for the name of the program which the user desires to load into active memory.

The command, NEW, permits the user to enter a new program in the manner as described below.

The command, RUN, causes the program which is stored within active memory to begin execution.

The command, SAVE, will save the program then currently stored within active memory onto a data disk.

The command, PROGRAM, allows the user to enter a program menu in which the loaded program can be edited. The same program menu is also entered upon selection of the command, NEW.

Turn now to Table 2, which depicts a screen display in the case where the commands NEW or PROGRAM have been selected.

TABLE 2

Title: Example Program for Angiograms
Doctor: Who
Patient: Him
(Prompt appears here)

| Event | # Frames | Rate | ECG | Table | A/B/Sim/Alt | Inj | Delay |
|---|---|---|---|---|---|---|---|
| 1 | 5 | 3.6 | | | A | | |
| 2 | 8 | | * | | A | | |
| 3 | | | * | | A | | |
| 4 | | | | RIGHT | A | | |
| 5 | | | | LEFT | A | | |
| 6 | | | | | B | | |
| 7 | | | | | SIM | | |
| 8 | | | | | ALT | | |
| 9 | | | | | A | * | |
| 10 | | | | | A | | 3.5 |
| 11 | 8 | 2.9 | | | A | | |

Frame @ rate, Frame @ ECG, Wait for ECG, Table,
Select Changer(s), Injector, Delay, Enter Title Block
Insert, Delete, Erase, Quit An eleven-command program is indicated in Table 2. The user will first complete the title block by inserting a title name according to the user's choice. Generally the title will correspond to a sequence of X-ray exposures such as certain angiogram sequences for heart or brain scans. In the second line the responsible doctor is listed. In the third line is the patient's name and any other identifying numbers or count designations.

Below the title block is a sequential listing of the commands, each line or row represents a single command which is designated as an event. The cursor will initially reside in the command option, Framesrate. By selection of this command, such as by pressing the RETURN key, the user will obtain a prompt asking for the number of frames or numbers of photographic plates which are to be exposed and the time interval in which the exposure is to take place. In the example, in the command of Event 1, five photographs will be taken within a time interval of 3.6 seconds. Rates of up to four frames per second are possible with the film changer of the illustrated embodiment. The slowest frame exposure rate in the illustrated embodiment is one frame in 10 seconds. Event 1 is thus a command which will expose five frames at equal intervals within the first 3.6 seconds after initiation of the sequence as determined by activation of a manual dead man's switch (not shown) by the X-ray operator.

Event 2 is representative of a command created by selection of the option, FramesECG. In the example of Table 2, eight frames will be exposed in sequence upon the receipt of an ECG signal from ECG unit 28. In the illustrated embodiment the ECG rate will be determined by unit 28 and communicated to computer system 12. The eight frames will be taken at equal intervals with a time duration of a single heartbeat as determined by the then-current average heartbeat rate of the patient. Thus, in the example of Event 2, eight frames will be taken of a single heartbeat cycle.

Event 3 is created by selection of the command, Wait for ECG. Thus, the sequence in Event 3 will simply wait for an ECG signal to occur and no photographic exposures will be made.

In Event 4 table 30 will be given a command to execute one unit of right translation. The unit of length is determined by the design of table 30. Event 4 is created by selecting the command selection, TABLE, from the menu at the bottom of Table 2. Similarly, a LEFT command can be entered in response to a prompt from selection of the command, TABLE, as seen in Event 5.

In Event 6, the command, SELECT CHANGERS, has been chosen and a prompt will be provided requesting an indication of whether film changer A, film changer B, simultaneous operation of changers A and B or alternate operation of changers A and B are requested. Normally, changer A will be selected as a default condition. However, a responsive entry can be made to select changer B instead. A second responsive entry can be made to simultaneously send commands to changers A and B to make photographic exposures at the same time. A single photographic exposure will be made as a default condition, or the frames can be made at a predetermined rate in response to an ECG signal as described above.

Event 9 is obtained by selecting the command, INJECTOR. During the execution of Event 9 injector unit 26 will be activated to inject as predetermined amount of radiopaque dye into the patient.

Thereafter an Event 10, a time delay during which no operation occurs, will be executed for 3.5 seconds. This command is chosen by selection of the command DELAY from the menu. A prompt then will request the number of seconds of delay. In the illustrated embodiment, up to 25 seconds of delay in one tenth second intervals is permitted.

Finally, Event 11 is a repetition and reselection of the command, Frames@rate. However, in response to the prompt the user has entered in this example the instruction that eight frames be taken in 2.9 seconds.

The eleven-step program of Table 2 is thus a photographic sequence in which 21 X-ray exposures will be made of, for example, the heart, before and after injection of a radiopaque dye with a movement of the patient between subsequences of exposure together with appropriate delay following dye injection.

The commands, Enter Title Block, allows a new title block to be entered including the overriding of a prior title block. The commands INSERT, DELETE and ERASE are editing commands which allow the user to enter a program and insert, delete or erase any given Event in the program. For example, if the command INSERT was selected, a prompt is displayed requesting the number of the Event which will immediately follow the new Event to be entered. If, for example, a new Event were to be placed between Events 4 and 5 in Table 2, the user would enter the numeral 5 in response to the prompt. A new blank line 5 would then be generated in the display with the following Events appropriately renumbered. The user then has the opportunity to select other ones of the commands to specify the new Event 5. The DELETE command will similarly delete a specified Event line while the ERASE command erases the entire program. Selection of the QUIT command returns the program to the main menu as illustrated in Table 1. In the illustrated embodiment up to 125 distinct commands or events can be entered in a single program. The number of programs which can be facilitated is limited only by the storage capacity of the data disk.

Thus, it can be readily appreciated that the control of X-ray photographic system 10 pursuant to the program control as described in connection with Tables 1 and 2 in a system as depicted in FIG. 1 is extremely flexible and versatile. It must be understood that in addition to the peripherals shown and described in FIG. 1, many additional peripheral units may be added or substituted to those specifically discussed without departing from the spirit and scope of the invention. For example, instead of utilizing an ECG signal as a physiological trigger in unit 28, other physiological signals may be substituted, such as various number signals or brainwave patterns.

Figure 2:
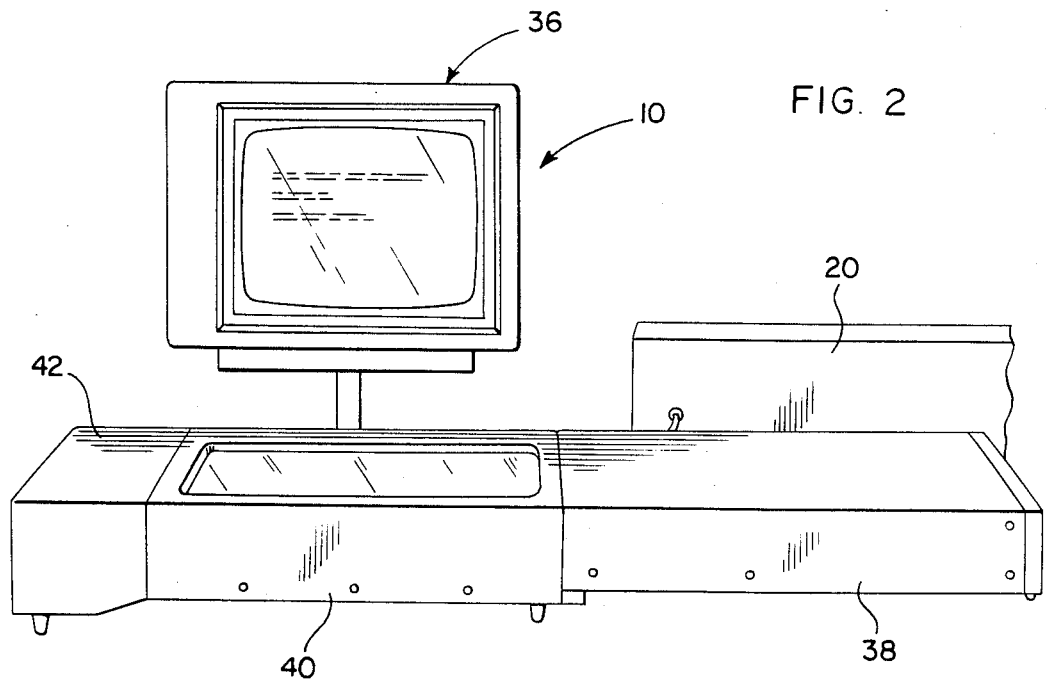
FIG. 2 is a simplified perspective view of the programmable film changer.

The overall operation of X-ray photographic system 10 now having been described, turn specifically to the simplified perspective view of FIG. 2 illustrating a programmable film changer according to the invention.

FIG. 2 is a simplified perspective view of the assembled programmable film changer of the invention, again generally denoted by reference numeral 10. System 10 includes a CRT display, generally denoted by reference numeral 36 on which screen displays, such as shown in Tables 1 and 2, are displayed. Normally the CRT is physically separated from the exposure frame which is actually located at an exposure station. Film is contained within a conventional film supply cassette 38 which is coupled to an exposure frame 40. Film is moved from film supply cassette 38 into exposure frame 40 in the proximity of the exposed patient. The film is exposed while in exposure frame 40 and is then removed to film receiving cassette 42. Film receiving cassette 42 is connected to the opposing end of film exposure frame 40 opposite that of supply cassette 38. Additional control of electronics as described above in connection with FIG. 1 is included within interface unit 20 as shown in FIG. 2 in partially cut away view. Omitted from FIG. 2 for the sake of simplicity are the input and output devices connected with computer system 12, such as keyboard and disk drive. The means by which film is taken from supply cassette 38 into exposure frame 40, exposed and then removed to receiving cassette 42, are better understood by now turning to FIG. 3.

Figure 3:
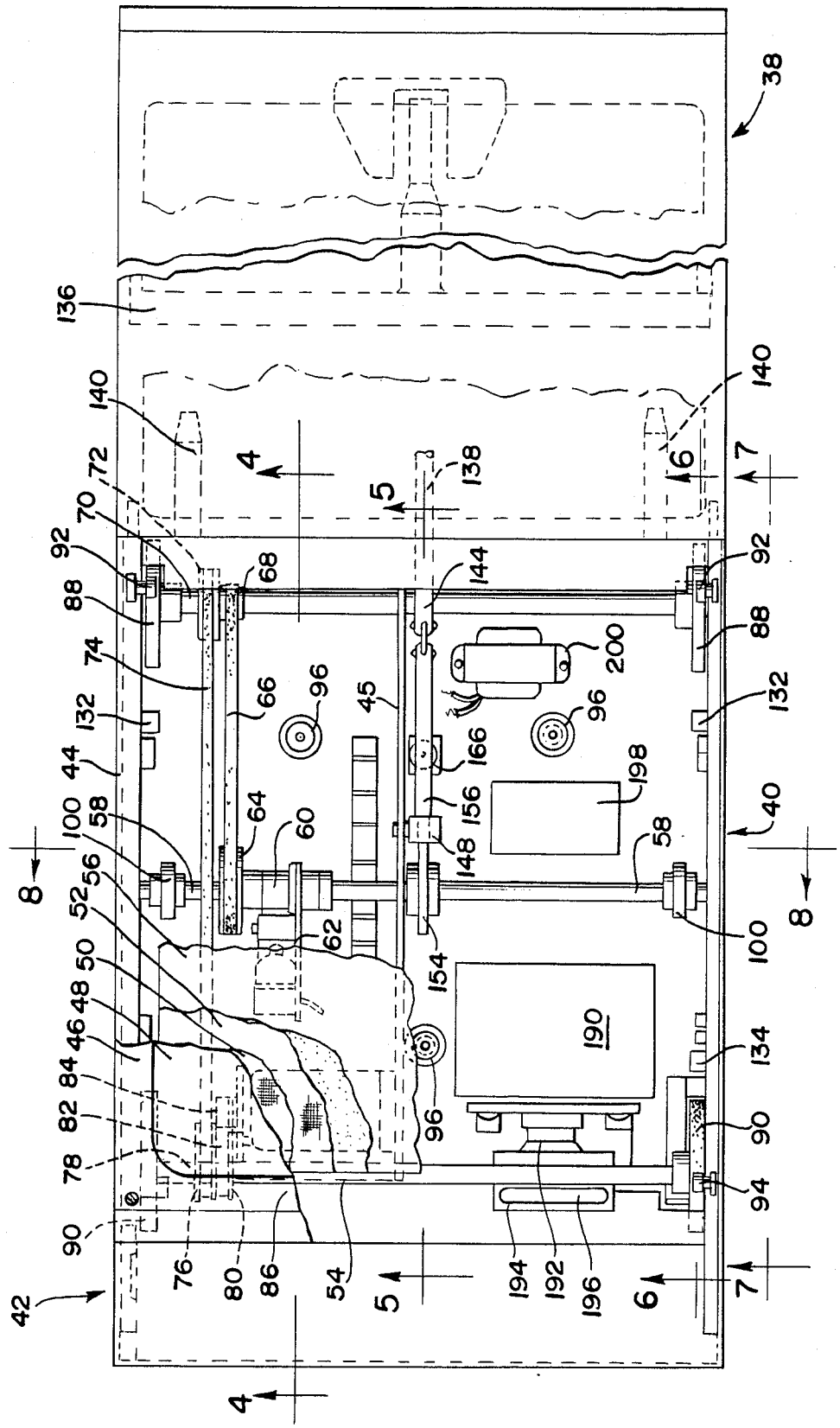
FIG. 3 is an enlarged top plan view of FIG. 2 with portions broken away.
Figure 10:
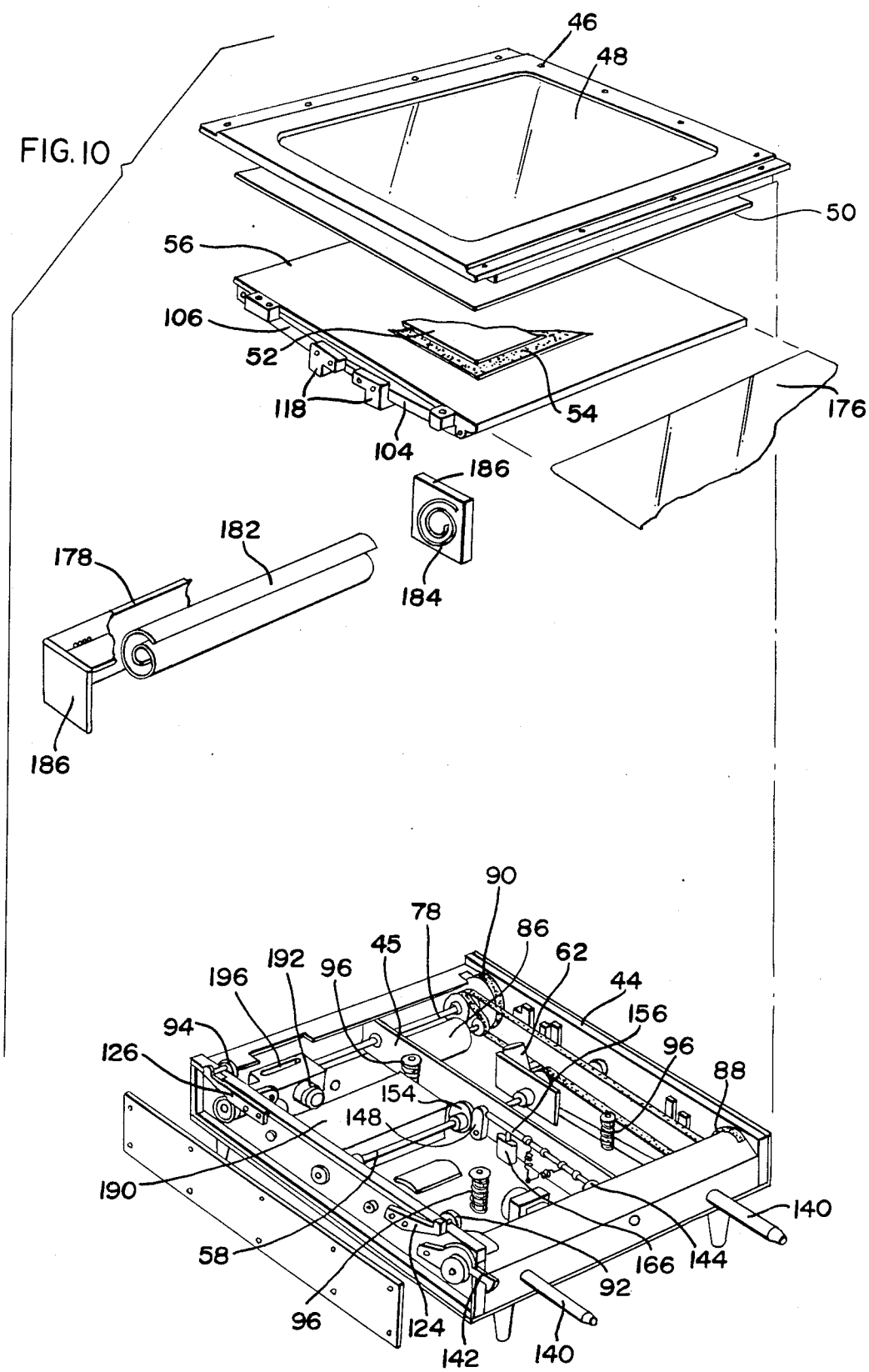
FIG. 10 is a simplified exploded perspective of the various elements and components of the clutch mechanism.

FIG. 3 is an enlarged top plan view of film exposure frame 40 illustrated with the upper portions broken away. Supply film cassette 38 is also shown in broken away view connected to exposure frame 40, as is receiving cassette 42. FIG. 10 is an exploded simplified perspective view of the exposure frame shown in FIG. 3. Exposure frame 40 is contained within a rigid boxlike chassis 44. Covering chassis 44 is an exterior structural frame 46 extending around the periphery of chassis 44 for the purpose of clamping an opaque protective glass or plastic covering 48 across the top of chassis 44. In the illustrated embodiment, a thin layer 50 of X-ray photoluminescent material is attached to the underside of protective covering 48. A space is then provided between layer 50 and a similar thin layer 52 of X-ray photoluminescent material. Layer 52 in turn is attached to a thin sponge or foam layer 54 which also extends across the entire upper area within chassis 44. Foam layer 54 in turn is attached to a metallic pressure plate 56 which will be described in greater detail below. Film from supply cassette 38 is inserted between photoluminescent layers 50 and 52 and sandwiched tightly therebetween by movement of pressure plate 56 upwardly and against rigid covering 48.

Operation of exposure frame 40 is based upon the rotation of a main driveshaft 58. One rotation of shaft 58 corresponds to one machine cycle. Driveshaft 58 is coupled to the output of a single revolution clutch 60. Clutch 60 is of conventional design and is characterized by engagement for a single revolution after which it is automatically disengaged. Clutch 60 then remains disengaged until once again activated, after which it will be engaged again for a single revolution. Clutch 60 in the illustrated embodiment is activated by operation of solenoid 62. The use and significance of a single revolution clutch 60 will be better described below after the component parts of exposure frame 40 have been discussed.

The input of clutch 60 is coupled to a belt and gear drive train. In particular, gear 64 is coupled to the input of clutch 60. Gear 64 in turn is driven by a toothed belt 66. Toothed belt 66 is driven by a gear 68 which is connected to a first drive roller shaft 70. Drive roller shaft 70 in turn is driven by a gear 72. Gear 72 is driven by a toothed belt 74. Toothed belt 74 extends across chassis 44 to a gear 76 connected to a second roller drive shaft 78. Second roller drive shaft 78 in turn is driven by a gear 80. Gear 80 is driven by a gear 82 which is connected to an output gear 84 of motor 86. Gear 84 is coupled to the output shaft of electric motor 86.

In the illustrated embodiment, motor 86 runs continuously during the operation of exposure frame 40 whether or not film is being fed into, exposed, or moved within exposure frame 40. Therefore both drive shafts 78 and 70 are continuously turning, as is gear 64 at the input of clutch 60. However, main drive shaft 58 will turn for a single revolution only in those instances where clutch 60 has been activated by solenoid 62.

As will better be described below, drive roller shafts 70 and 78 are coupled at each of their ends to a pair of rubber drive rollers 88 and 90 respectively at each end of shafts 70 and 78. The driving force is imparted to the film by virtue of drive rollers 88 and 90 in a selective manner by cooperation with pinch rollers 92 and 94 corresponding respectively to drive rollers 88 and 90. The selective activation of pinch rollers 92 and 94 again will be described below.

However, the transport of the film can now be generally described. Film is injected into exposure cassette 40 between drive rollers 88 and pinch rollers 92. Pinch rollers 92 are then selectively lowered to press the film against drive rollers 88. Drive rollers 88 then drive the film across photoluminescent layer 52 for the length of chassis 44. The film is exposed and pinch rollers 94 are then selectively actuated to press the top edges of the exposed film against rollers 90. Rollers 90 then drive the exposed film into receiving cassette 42.

Consider now the means by which pinch rollers 92 and 94 are actuated, the means by which the film is injected from supply cassette 38 into exposure frame 40, and the means by which pressure plate 56 is brought to bear against the film during the exposure cycle. Pressure plate 56 is supported within chassis 44 by means of three spring-loaded supports 96. As seen in FIG. 3, two of the supports are in the right portion of chassis 44 and the third in the left portion. The leftmost support 96 is coupled to a support bar 98, best seen in FIG. 5. Support bar 98 is coupled at each of its ends to pressure plate 56. Therefore pressure plate 56 is supported at four points near its center region. Pressure plate 56 is a 1/16th inch thick sheet of aluminum substantially covering the open upper area of frame 44 and is stiffened on its periphery by a rectangular aluminum frame 116. However, when the periphery of pressure plate 56 is pulled downwardly by means which will be described particularly in connection with FIGS. 6 and 9, pressure plate 56 is bowed, thereby forming an upwardly directed convex surface. Similarly, foam layer 54 and photoluminescent layer 52 which is connected to pressure plate 56 will be similarly bowed and the film placed thereon will be placed upon a convex surface.

As pressure plate 56 is then moved upwardly toward layer 50 it will first contact the film in its center region which is characterized by the apex of the convex surface. Thereafter, as the periphery of pressure plate 56 is relaxed and is reassumes its natural substantially flat configuration, pressure plate 56 will press the film against the opposing flat surface of layer 50 and plate 48 beginning at the center and moving outwardly in all directions toward the periphery of the film plate. As a result there are substantially no air bubbles trapped between the film and either one of layers 50 or 52. An intimate and close contact is thus made between the film and the adjacent photoluminescent layers with the result that accurate and high resolution X-ray exposure can be obtained.

Figure 6:
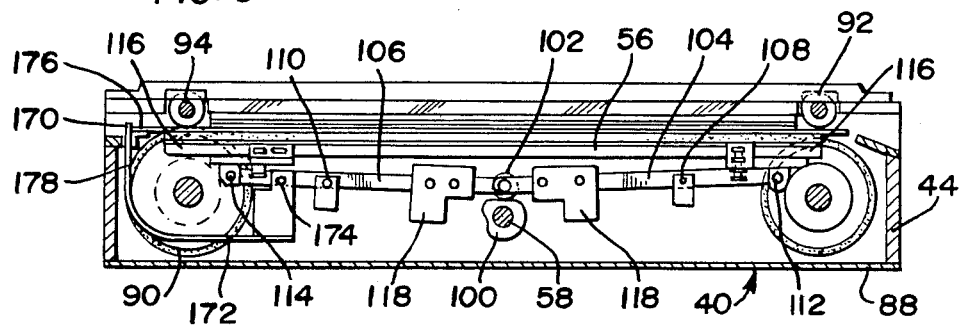
FIG. 6 is a longitudinal section viewed along line 6—6 of FIG. 3 along the center line of the film changer, illustrating the pressure plate and bending components for the pressure plate, film advancing, indexing device and storage device.
Figure 7:
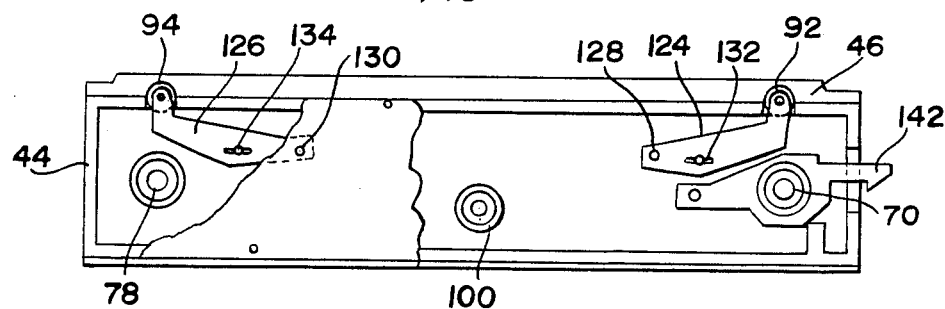
FIG. 7 is a side elevational view of the film changer with portions of the side cover plate broken away.
Figure 8:
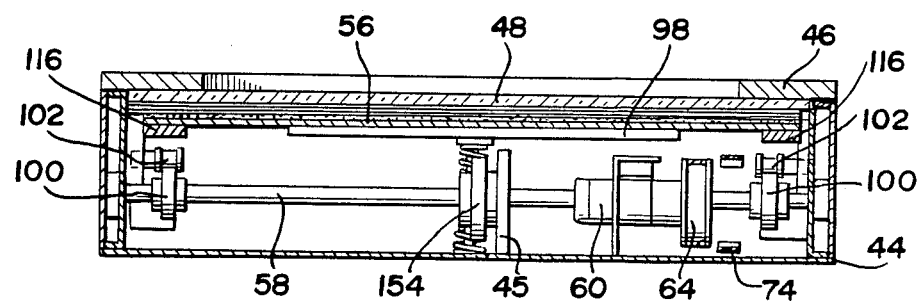
FIG. 8 is a transverse section taken along line 8—8 of FIG. 3, generally through the center of the film changer.

Turn now to FIG. 6 which is a cross sectional view of exposure frame 40 as seen through lines 6—6 of FIG. 3. Main drive shaft 58 is provided with an eccentric cam 100 at each end near frame 44 as best depicted in plan view in FIG. 3. As shown in FIG. 6, a follower roller 102 rides on cam 100. Roller 102 is pivotally connected to the ends of two lever arms 104 and 106. Lever arms 104 and 106 are pivotally connected to chassis 44 about a pivot pin 108 and 110 respectively. The opposing end of each arm 104 and 106 is pivotally connected through pivot pins 112 and 114 respectively to opposing corners of rectangular pressure plate frame 116. The thin pressure plate 56 is then attached to frame 116.

Figure 9:
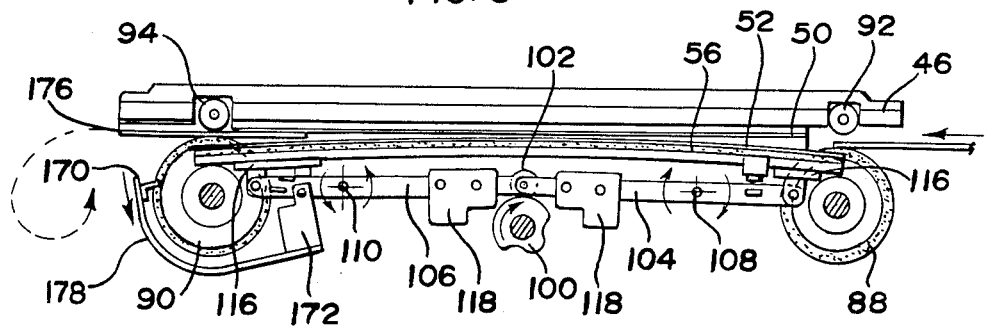
FIG. 9 is a sectional view similar to FIG. 6, but showing the film pressure plate in an exaggerated bowed condition.

Turn now to FIG. 9, which shows in simplified diagrammatic view the operation of lever arms 104 and 106 with respect to pressure plate 56. Portions of exposure frame 40 have been omitted for the sake of clarity. As cam 100 rotates, it pushes upwardly on follower 102. Levers 104 and 106 thus rotate about their respective pivot points 108 and 110 to draw the opposing ends of pressure plate 56 downwardly. Since pressure plate 56 is supported by support 96 near its center region, pressure plate 56 bows and forms an upwardly directed convex surface. Counterweights 118 are attached to lever arms 104 and 106 to provide for smooth operation without excessive vibration.

However, when in the convex position as shown in FIG. 9, each of the four corners of pressure plate 56 will be pulled downwardly. As a result, the entire pressure plate is also pulled downwardly within chassis 44 against resilient spring supports 96. For example, turning specifically to FIG. 5, which is a cross-sectional view taken through line 5—5 of FIG. 3, each support 96 includes a center stanchion 120 about which a coil compression spring 122 is disposed. A washer 124 is provided on the upper end of coil spring 122 and bears against the bottom of pressure plate 46 or against a support bar 98 as may be appropriate. Blind holes are defined within pressure plate 56 to allow a limited degree of movement of pressure plate 56 downwardly within chassis 44. In the illustrated embodiment pressure plate 56 moves downwardly when in the flexed configuration as shown in FIG. 9 by approximately 0.180 inch.

Conversely, when cam 100 rotates to a position such as shown in FIG. 6, pressure plate 56 is allowed to relax and assume its normally flat configuration. At this point pressure plate 56 moves upwardly to the maximum extent within frame 44 as urged by each of the spring loaded supports 96. Should a misfeed of film from supply cassette 38 occur, namely should two or more sheets be inserted into exposure frame 40, pressure plate 56 is simply pressed against the multiple film plates by means of spring loaded supports 96 and the natural resiliency of pressure plate 56 without the exertion of a positively driven force such as through a belt drive or gear transmission as is typical in the prior art. In other words, in prior art film changers the pressure plate is typically forced against the film by a positive mechanism. In the event that more than one sheet may be disposed against the plate, the positive drive of prior art devices could jam resulting in the stripping of gears and other permanent mechanical damage to the film changer.

Consider now the means by which pinch rollers 92 and 94 are selectively operated in order to drive the film across chassis 44. Turn specifically to FIG. 7 which is a cross-sectional view of selected portions of exposure frame 40 as seen through lines 7—7 of FIG. 3. Elements of the invention have been omitted for the purposes of clarity. Pinch rollers 92 and 94 are pivotally coupled to rocker arms 124 and 126 respectively. Each rocker arm 124 and 126 is pivotally coupled to frame 44 about a pivot pin 128 and 130 respectively. A tab 132 and 134 extends inwardly into chassis 44 from rocker arms 124 and 126 respectively, as best seen in the plan view of FIG. 3. When pressure plate 56 is configured into the bowed condition as shown in FIG. 9, frame 116 of pressure plate 56 contacts tabs 132 and 134 pushing them downwardly. This rotates rocker arms 124 and 126 so as move pinch rollers 92 and 94 downwardly as well. Pinch rollers 92 and 94 will thus be moved downwardly and into contact with portions of the film adjacent rubber drive rollers 88 and 90 respectively. Normally, rocker arms 124 and 126 are each spring biased by means not shown, in an upward and disengaged configuration with respect to rollers 88 and 90. Thus cam 100 serves not only to actuate movement of the pressure plate 56, but through the action of pressure plate 56 also serves to actuate the film transport mechanism through pinch rollers 92 and 94. The coaction of these means will be better described below in connection with the timing diagram of FIG. 11.

Consider now the means which is used to inject film from supply cassette 38 into exposure frame 40. Return now to the plan view of FIG. 3. Film is held within a reciprocating rack mechanism 136 in conventional supply cassette 36 which mechanism 136 will advance a sheet of film a few inches from the edge of supply cassette 36 upon inward displacement of a reciprocating rod 138. The details by which such a partial ejection of a film sheet will thus not be further described insofar as supply cassette 38 is concerned since the cassette is conventional. Supply cassette 38 is connected to exposure frame 40 by means of locking alignment pins 140 and a locking catch 142 best shown in FIG. 7.

Figure 5:
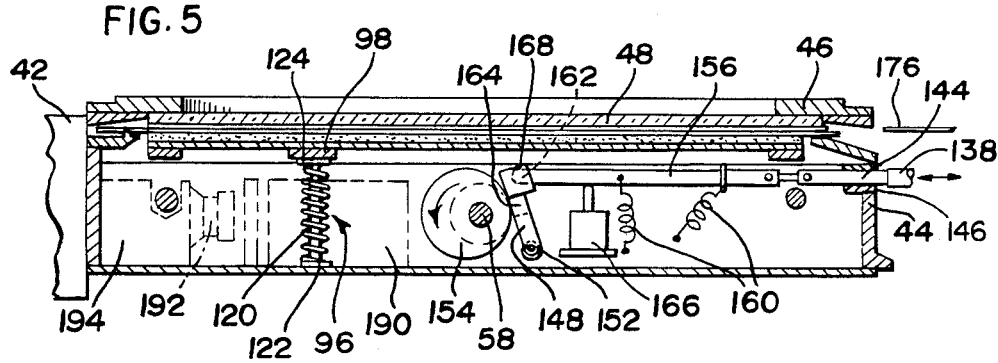
FIG. 5 is a longitudinal section along line 5—5 of FIG. 3 illustrating the cam and related mechanisms for releasing a single film plate from a conventional film cassette.

Reciprocating rod 138 is actuated by means which is best described in connection with FIG. 5. Turning to FIG. 5, rod 138 in the supply cassette shown in FIG. 3 abuts and is actuated by a reciprocating push-rod 144 extending through a bushing 146 defined in frame 44. The opposing end of reciprocating push-rod 144 is pivotally coupled to rod 156. Rod 156 is rotatably connected to push-rod 144 at one end and at the opposing end is guided and captured within a cam follower 148. Cam follower 148 is spring biased to contact and follow cam 154.

As seen in the plan view of FIG. 3 a cam 154 is connected to main drive shaft 58 and contacts follower 148. Springs 160 bias rod 156 to maintain it in contact with the plunger of solenoid 166 and urges rod 156 to a leftmost retracted position as depicted in FIG. 5. Springs 160 maintain rod 156 in a position normally directed to a throughhole 164 defined through follower 148. Rod 156 rides on the plunger solenoid 166. When solenoid 166 is not activated, rod 156 assumes a lowered position so that cam follower 148 reciprocates without engaging rod 156. In this configuration rod 156 is not activated and push-rod 144 remains in a retracted position. Therefore, no film is advanced from supply cassette 38. However, when solenoid 166 is activated, end 162 of rod 156 is elevated as rod 156 rotates about its coupling with push-rod 144. As cam 154 then drives cam follower 148 to the right as shown in FIG. 5, end 162 of rod 156 is disposed in a socket 168 of cam follower 148. Cam follower 148 is then rotated in a clockwise direction as seen in FIG. 5 and push-rod 144 is activated. Push-rod 144 abuts rod 138 in the supply cassette and as a result a photographic plate is ejected from supply cassette 38 by a distance sufficient to place its leading edge between drive roller 88 and pinch roller 92.

Motor 86 drives rollers 88 and 90 at such a velocity that the film is forced across chassis 44 at a rate of approximately 160 inches per second. Therefore, considerable momentum is imparted to each film plate as it is fed into exposure frame 40. As the film plate nears its final position, pinch rollers 92 and 94 are disengaged from drive rollers 88 and 90 respectively as pressure plate 56 moves upward into an intermediate position. The momentum of the film plate is sufficient to allow it to continue to travel across chassis 44 until it reaches a registration stop 170 best depicted in FIG. 6. Then the plate moves upward and assumes its natural and substantially flat configuration. Stop 170 is the end of a rotatable arm 172. Arm 172 is coupled to chassis 44 about a pivot pin 174. When pressure plate 56 is relaxed as shown in FIG. 6, film plate 176 is fully inserted and its upper edge bears against stop 170. The upper edge is prevented from curling by a leaf spring 178 horizontally extending from stop 170 and underneath the upper edge of film plate 176. Arm 172 is spring biased to assume a normally upward position and interfering position. However, when pressure plate 56 is flexed as depicted in the configuration of FIG. 9, frame 116 or an extension coupled to frame 116 will bear against arm 172 thereby forcing stop 170 downwardly and out of interference with film plate 176. This then will allow the removal of the exposed film plate 176. However, stop 170 insures that film plate 176 is registered within exposure frame 40 after it has been initially fed. Film stop 170 could also be solenoid actuated instead of mechanically linked to pressure plate 56 without departing from the scope of the invention.

Figure 4:
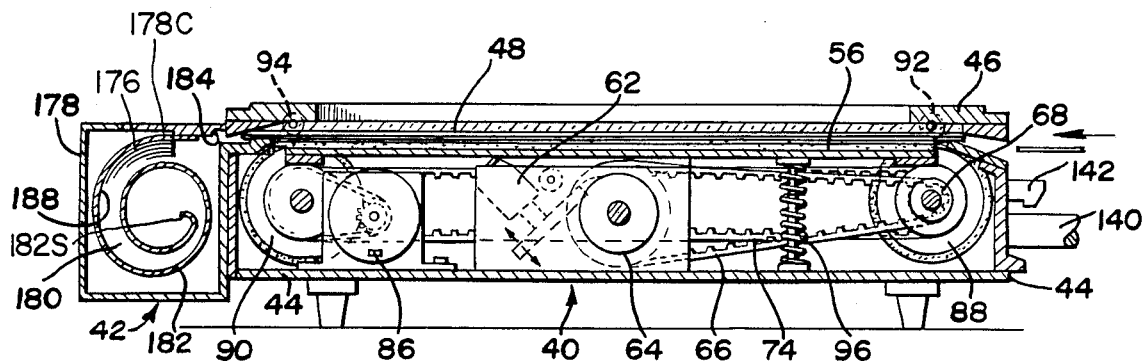
FIG. 4 is a longitudinal section taken along lines 4—4 of FIG. 3 illustrating the drive and single revolution clutch mechanism of the film changer.

After photographic plate 176 has been exposed, it is removed from exposure frame 40 and disposed within receiving cassette 42. Turn now to FIG. 4, which is a cross-sectional view taken through line 4—4 of FIG. 3. Receiving cassette 42 is of a passive-type which includes no film drive mechanism, in the form of a lighttight box 178 in which a spiral chamber 180 is defined by means of a spiral metal guide plate or sheet 182 disposed within box 178. As is illustrated in FIG. 4, the spiral guide plate 182 has an upper end extending adjacent a pivoted top cover 178C of the cassette box 178, and extends in a spiral configuration in excess of one and one-half 360° turns, with an inner end terminating in a radially inward-extending film stop portion 182S. An aperture 184 is defined through box 178 so that box 178 is coupled to frame 44 and film 176 is disposed through aperture 184 into box 178. As is clearly shown in FIG. 4, drive roller 90 forces photographic plate 176 into spiral chamber 180 thereby causing the photographic plate to roll or spiral within the chamber without a leading edge of the film plate engaging a trailing portion of the film plate. The exploded perspective view of FIG. 10 depicts spiral sheet 182 in better detail. Spiral sheet 182 is maintained in a spiral configuration by virtue of its insertion at its opposing ends into a spiral groove 184 defined in each of the end portions 186 of chassis 178.

Because of the natural resiliency of the plastic photographic plate 176, the plate tends to resist flexure as it is disposed within spiral chamber 180. As a result, as the initial photographic plate is disposed within spiral chamber 180, it lies against the radially inner most surface 188 of spiral chamber 180. The photographic plate is retained by virtue of its resiliency at all times against surface 188. Therefore each subsequent photographic plate is nested within the previously received photographic plate and the entire collection of exposed photographic plates is maintained within receiving cassette 42 in a manner which is independent of the orientation of gravity with respect to receiving cassette 42.

Return now to FIG. 3 and consider the means for selectively writing a programmable alphanumeric label upon the exposed photographic plate. Included within chassis 44 is a light box 190. Light box 190 includes a conventional LCD display (not shown) which is selectively illuminated by a flash tube (also not shown), computer system 12 is electrically coupled to the LCD display within light box 190 and multiple lines of alphanumeric information can be arbitrarily written subject to program control on the LCD display. The flash tube is then selectively controlled by computer system 12 to illuminate the LCD display at the appropriate point during the exposure cycle. The illuminated LCD display is then projected by means of a conventional lens 192 and conventional prismatic optics 194 to optically project the alphanumeric information on the LCD display across a face plate 196. The illuminated information on face plate 196 is then photographically printed onto the adjacent photographic plate 176 at the appropriate moment.

Interface electronics and power supplies for the various solenoids, motors and light box 190 contained within chassis 144 are contained on a circuit board 198 according to conventional design principles. Similarly, additional electronic components may be disposed within chassis 44 as needed, such as power transformer 200.

Figure 11:
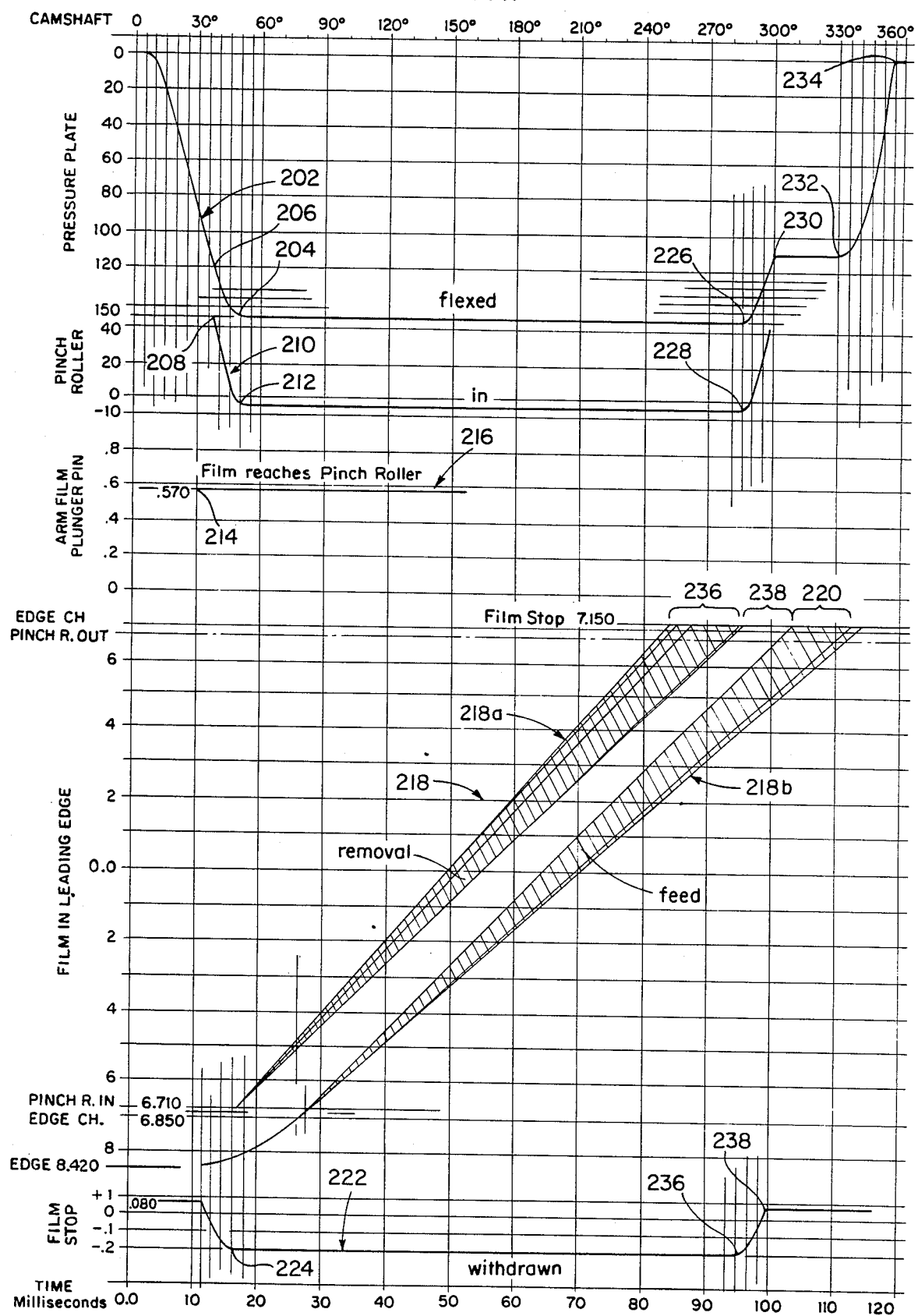
FIG. 11 is a timing diagram of the pressure plate, roller, and film stop relative to the transport of the film through the changer.

The various components of the film changer now having been described, consider the overall timing of the film changer as best depicted in FIG. 11. FIG. 11 is a timing diagram illustrating a single revolution of cam shaft 100. The horizontal axis as shown on the upper edge of FIG. 11 represents the degrees of angular displacement of cam 100. The horizontal scale on the lower portion of FIG. 11 illustrates an equivalent timing for an within 120 milliseconds. The cycle begins with the cam at a reference position of zero degrees. As the cam rotates the pressure plate begins to move downwardly as depicted by line 202. The vertical scale of line 202 refers to the approximate displacement of the periphery of pressure plate 56. At approximately 50 degrees rotation of cam 100 pressure plate reaches its maximum flexure at point 204 represented by approximately 0.150 inch deflection. However, when pressure plate 56 has been moved and deformed by an extent represented by point 206, pinch rollers 92 and 94 will begin to be activated as represented by point 208 on line 210. By the time pressure plate 56 reaches its full extent of curvature and downward displacement, as represented by point 204 on line 202, pinch rollers 92 and 94 have similarly been downwardly displaced by the maximum extent as represented by point 212 of line 210. In the illustrated embodiment, pinch rollers 92 and 94 ride approximately 0.040 of an inch above their respective drive rollers 88 and 90. And when fully activated, pinch rollers 92 and 94 will be depressed into their respective drive rollers by approximately 0.005 inch as depicted by point 212.

Meanwhile, cam 154 has activated push-rod 144 beginning at point 214 as represented on line 216. Thus it can be appreciated that the film is in position between pinch roller 92 and drive roller 88 by the time that pinch roller 92 comes into contact with the drive roller at point 212 on line 210. The position of the leading edge of the film plate being fed into the exposure frame is depicted by lines 218b which also represent the expected errors in positioning during the cycle. In other words, the extreme in left and right most lines of curve 218b represents the extreme boundaries or uncertainties of the film plate position. The center point of frame 44 is represented by the reference 0.0 on the vertical scale to which lines 218 correspond. Film plate 176 reaches the registration stop 170 at some point within the interval 220.

Line 222 represents the position of film stop 170 which reaches the fully retracted position at point 224 as pressure plate 56 is fully bowed as symbolized by point 204 of line 202. Therefore, from approximately 50 degrees of cam position to approximately 285 degrees, pressure plate 56 remains bowed, pinch rollers 92 and 94 are engaged, film stop 170 is in the inoperative position, and the photographic plate is being moved across frame 44.

At point 226 shown on line 202, pressure plate 56 is moved to the intermediate position thereby withdrawing pinch rollers 92 and 94 beginning at point 228 on line 210. Pressure plate 56 is raised enough to disengage the pinch rollers by approximately 300 degrees displacement as shown by point 230 of line 202 and to activate film stop 170. However, deflection of pressure plate 56 is maintained constant until slightly after 330 degrees, as depicted by point 232 to allow the momentum of the photographic plate to continue to move the plate into contact with film stop 170. Thereafter pressure plate 56 is fully relaxed by approximately point 234 which is nearly a complete single revolution.

Film stop 170 while being withdrawn, begins to reassume its registration or stop position at point 236 corresponding to point 226 of the cam shaft and assumes a fully operative stop position by point 238, corresponding to point 230 of the cam shaft. Thus the stop is in position by the time that the photographic plated is fitted in as depicted by line 218b.

Removal of the photographic plate is similarly accomplished in a single revolution of cam 100. Removal of the photographic plate is depicted by line 218a. Line 218a represents the position of the trailing edge of the exposed photographic plate. The trailing edge thus begins to move when the pinch rollers are engaged at point 212. The rear edge of the photographic plate passes the film stop location some time during the interval 236. Film stop 170 is withdrawn at all times during the removal of the photographic sheet and falls into place prior thereto, as depicted by point 238 which lies in the interval 238 between the latest time at which the trailing edge of the exposed photographic plate passes the film stop location and before the earliest time the leading edge of the next unexposed photographic plate reaches the film stop location.

Based on the operation as depicted in FIG. 11, one having ordinary skill in the art can readily determine how cams 100 and 154 need be cut and oriented in order to accomplish the various results and operation of the invention.

The organization of changer 22 and system 10 now having been generally described, it can be readily appreciated that the operation of changer 22 and 24 as depicted in FIG. 1 can be selectively and arbitrarily controlled according to program control without the necessity of synchronization of their respective motors 86 or other elements within the operational cycle as determined by the position of drive shaft 58 and its associated cams 100 and 154. Whether any given changer A or B operates is dependent upon whether single revolution clutch 60 is selectively actuated by means of its corresponding solenoid 62. Similarly, whether or not a photographic plate is fed into film changer is dependent upon whether solenoid 166 and its associated mechanism for actuating plunger rod 144 has been selected and actuated. Therefore, the operation of changers 22 and 24 may be coordinated with each other in a totally flexible and arbitrary means by providing appropriate control signals through interface unit 20. The control signals provided to changers 22 and 24 in turn can be conditioned on the existence of control signals or sensed signals in any other periphery in system 10 in FIG. 1. As previously described, the operation of either changer 22 or 24 can be made contingent on the operation or non-operation of injector unit 26, either X-ray generators 32 and 34, Table 30, or a physiological sensing unit, such as ECG unit 28. The sequence of events and the contingency can be arbitrarily programmed. This allows, for example, among other advantages, that the operation of the X-ray exposure can be made dependent upon the status of any other peripheral unit. For example, if an ECG signal has not been obtained from unit 28, or if an X-ray generated at 32 indicates through bidirectional communication through hardware unit 20 that it is inoperative, the entire X-ray exposure procedure can be aborted. Computer system 12 can thus contain error checking schemes which first interrogate each of the peripheral units which will be used in the programmed exposure sequence to determine whether such units are present and operable prior to undertaking any operation. No complex electromechanical sensing, gearing or motor synchronization is required to achieve subtle and complex coordination among the number of units included within system 10 as described in FIG. 1. This is possible, in part, due to the inclusion of single revolution clutch 60 within each changer 22 and 24. The motive means in each changer is continuously running during the cycle. However, the operative cycle is not begun until clutch 60 is activated. Clutch 60 can be activated independently of the status of the motive driving mechanism in each changer. Once the cycle is initiated by activating clutch 60, cams 100 and 154 will effectuate a film plate insertion or film plate removal if an exposed plate is present without further computer supervision.

Many modifications and alterations may be made by those having ordinary skill in the art without departing from the spirit and scope of the invention. The specific timing which has been shown and the means used to operate the various functions as well as their coordination can be varied without departing from the spirit and scope of the invention.

We claim:

1. A passive-type cassette which includes no film driving mechanism, for receiving exposed resilient film from a film exposure device, which comprises:
   an essentially box-shaped member having a film-receiving feed-in aperture; and
   a spirally-shaped guide plate formed into an inwardly spiraling configuration such that a first resilient film fed into the inwardly spiraling configuration, is fed along an inwardly spiraling path defined by said spirally-shaped guide plate, and becomes disposed into engagement with an inner surface of the guide plate and assumes a configuration corresponding to that of the guide plate to facilitate storage of the film, the guide plate being positioned such that each subsequently fed film becomes nested within each previously received film and maintained in nested relationship regardless of the orientation of the cassette.

2. The cassette of claim 1, wherein said cassette has opposite end walls and said spirally shaped guide plate has opposite ends received in spiral grooves in the opposite end walls.

3. The cassette of claim 1, wherein said spirally shaped guide plate extends in a spiral configuration in excess of 360°.

4. The cassette of claim 1, wherein said spirally-shaped guide plate extends in a spiral configuration in excess of one and one-half 360° turns.

5. The cassette of claim 1, wherein said spirally-shaped guide plate has an inner end terminating in a radially inward-extending film stop portion.

6. The cassette of claim 1, wherein said spirally-shaped guide plate extends in a spiral configuration in excess of one and one-half 360° turns and has an inner end terminating in a radially inward-extending film stop portion.

7. The cassette of claim 1, wherein said cassette has a pivoted top cover and the spirally shaped guide plate has an upper end extending adjacent the pivoted top cover.

8. The cassette of claim 1, wherein said cassette further comprises:
   opposite end walls with said spirally shaped guide plate having opposite ends received in spiral grooves in the opposite end walls; and
   a pivoted top cover, with said spirally shaped guide plate having an upper end extending adjacent the pivoted top cover, and with said spirally shaped guide plate extending in a spiral configuration in excess of one and one-half 360° turns and having an inner end terminating in a radially inward-extending film stop portion.

* * * * *